United States Patent
Machijima et al.

(10) Patent No.: US 11,835,070 B2
(45) Date of Patent: Dec. 5, 2023

(54) SENSOR ATTACHMENT TOOL AND FLUID PRESSURE CYLINDER

(71) Applicant: SMC CORPORATION, Tokyo (JP)

(72) Inventors: Mitsuru Machijima, Matsudo (JP); Hiroyuki Asahara, Tsukuba (JP); Aki Iwamoto, Kasukabe (JP); Shiori Iwatsuki, Saitama (JP)

(73) Assignee: SMC CORPORATION, Tokyo (JP)

( * ) Notice: Subject to any disclaimer, the term of this patent is extended or adjusted under 35 U.S.C. 154(b) by 31 days.

(21) Appl. No.: 17/624,127

(22) PCT Filed: Jun. 8, 2020

(86) PCT No.: PCT/JP2020/022552
§ 371 (c)(1),
(2) Date: Dec. 30, 2021

(87) PCT Pub. No.: WO2021/002152
PCT Pub. Date: Jan. 7, 2021

(65) Prior Publication Data
US 2022/0364580 A1 Nov. 17, 2022

(30) Foreign Application Priority Data
Jul. 4, 2019 (JP) .................... 2019-125140

(51) Int. Cl.
*F15B 15/28* (2006.01)
*F15B 15/14* (2006.01)
*G01D 11/30* (2006.01)

(52) U.S. Cl.
CPC ...... *F15B 15/2892* (2013.01); *F15B 15/1428* (2013.01); *F15B 15/2815* (2013.01);
(Continued)

(58) Field of Classification Search
CPC ............ F15B 15/2892; F15B 15/1428; F15B 15/2815; F15B 15/1433; F15B 15/2807;
(Continued)

(56) References Cited

U.S. PATENT DOCUMENTS 4,176,586 A * 12/1979 Stoll ................... F01L 25/08
91/DIG. 4
4,594,487 A * 6/1986 Grassl ................ F15B 15/2892
200/82 E (Continued)

FOREIGN PATENT DOCUMENTS

EP     1630424    *  3/2006   .......... F15B 15/1428
JP     57-42201 U    3/1982
(Continued)

OTHER PUBLICATIONS

International Search Report dated Aug. 11, 2020 in PCT/JP2020/022552 filed Jun. 8, 2020, 2 pages.
(Continued)

*Primary Examiner* — Dustin T Nguyen
(74) *Attorney, Agent, or Firm* — Oblon, McClelland, Maier & Neustadt, L.L.P.

(57) ABSTRACT

A fluid pressure cylinder has a sensor attachment tool mounted thereon. A holder holds the position sensor in a rail structure extending in an axial direction of a cylinder tube and is secured by screwing to a rod cover or a head cover in an arm part provided to one end of the holder.

10 Claims, 9 Drawing Sheets

(52) U.S. Cl.
CPC ........... *F15B 15/1433* (2013.01); *F15B 15/28* (2013.01); *F15B 15/2807* (2013.01); *G01D 11/30* (2013.01)

(58) Field of Classification Search
CPC ...... F15B 15/28; F15B 15/1423; F15B 15/20; G01D 11/30
See application file for complete search history.

(56) References Cited

U.S. PATENT DOCUMENTS

| | | | | |
|---|---|---|---|---|
| 4,838,146 | A * | 6/1989 | Stoll | F15B 15/02 92/165 PR |
| 4,903,933 | A * | 2/1990 | Yuda | H01H 9/0207 248/500 |
| 5,293,015 | A * | 3/1994 | Yuda | H01H 9/0207 248/500 |
| 6,007,034 | A * | 12/1999 | Stoll | F15B 15/2892 73/866.5 |
| 6,832,541 | B2 * | 12/2004 | Satou | F15B 15/1471 92/88 |
| 7,250,753 | B2 * | 7/2007 | Terasaki | G01D 5/145 91/1 |
| 7,372,708 | B2 * | 5/2008 | Terasaki | F15B 15/2892 200/275 |
| 7,613,014 | B2 * | 11/2009 | Tokumoto | F15B 15/2892 361/828 |
| 8,240,624 | B2 * | 8/2012 | Terasaki | F15B 15/2892 248/230.8 |
| 9,194,406 | B2 * | 11/2015 | Machijima | F15B 15/2815 |
| 10,113,569 | B2 * | 10/2018 | Oozeki | F16B 2/08 |
| 10,138,914 | B2 * | 11/2018 | Takakuwa | F15B 15/28 |
| 11,105,350 | B2 * | 8/2021 | Takakuwa | F15B 15/2861 |
| 2002/0047322 | A1 * | 4/2002 | Sato | H02K 49/10 310/12.01 |
| 2002/0100336 | A1 * | 8/2002 | Sakurai | F15B 15/2807 73/866.5 |
| 2005/0194239 | A1 | 9/2005 | Terasaki et al. | |
| 2006/0028202 | A1 | 2/2006 | Terasaki et al. | |
| 2013/0263733 | A1 | 10/2013 | Machijima et al. | |

FOREIGN PATENT DOCUMENTS

| | | | | |
|---|---|---|---|---|
| JP | 3-68603 | U | 7/1991 | |
| JP | H05-059212 | U | 8/1993 | |
| JP | 2005-249128 | A | 9/2005 | |
| JP | 2006-52744 | A | 2/2006 | |
| JP | 2006-266385 | A | 10/2006 | |
| JP | 2012-132500 | A | 7/2012 | |
| JP | 2016-205431 | A | 12/2016 | |
| JP | 2016205431 | | * 12/2016 | ............. F15B 15/28 |
| JP | 3210063 | | * 4/2017 | .......... F15B 15/1471 |

OTHER PUBLICATIONS

European Search Report dated Jun. 20, 2023, in corresponding European Patent Application No. 20 83 5260.9, (15 pages).

* cited by examiner

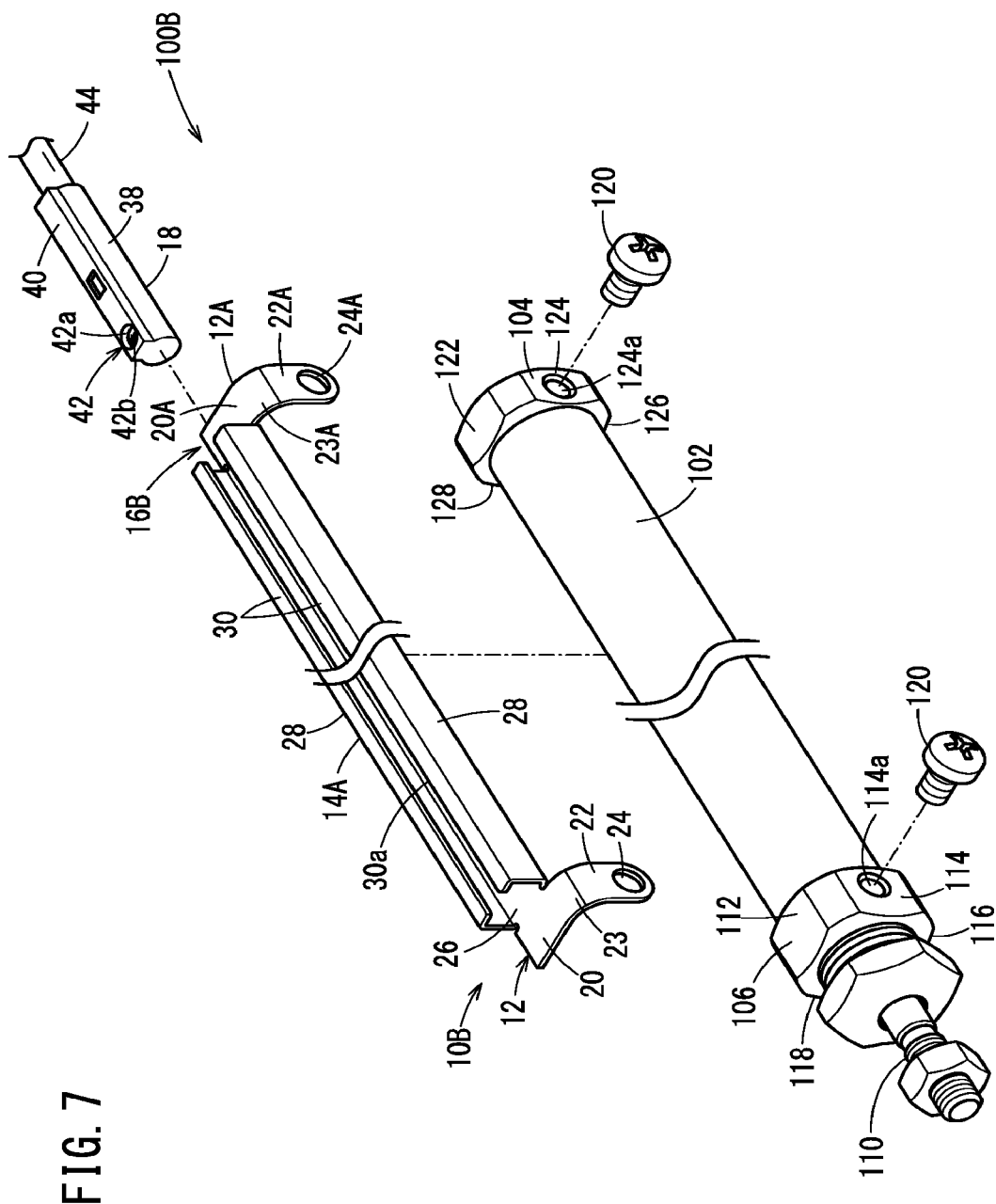

SENSOR ATTACHMENT TOOL AND FLUID PRESSURE CYLINDER

TECHNICAL FIELD

The present invention relates to a sensor attachment tool for attaching a position sensor to a fluid pressure cylinder, as well as to a fluid pressure cylinder.

BACKGROUND ART

Conventionally, in a fluid pressure cylinder, a position sensor using magnetism has been attached in order to detect an operating position of a piston or the like. The position sensor is attached to an outer circumferential part of a cylinder tube that is made up from a non-magnetic material, and detects the operating position of the piston by detecting the magnetism of a permanent magnet provided on an outer circumferential part of the piston.

The position sensor is attached to the outer circumferential part of the cylinder tube via a sensor attachment tool equipped with an attachment band. For example, in JP 2005-249128 A, a sensor attachment tool is disclosed, which is equipped with a holder in which a position sensor is retained, a band wound around the outer circumferential part of the cylinder tube, and a tightening mechanism for tightening the band. The tightening mechanism is disposed on an outer circumferential side of the holder, and the holder is fixed to the cylinder tube in a manner so as to be sandwiched between the cylinder tube, and the band and the tightening mechanism.

SUMMARY OF THE INVENTION

The fluid pressure cylinder is frequently put to use in a narrow space, and in order to prevent the fluid pressure cylinder from interfering with surrounding equipment, a case may arise in which it is required to suppress outward protrusion of the sensor attachment tool.

Thus, an aspect of the present invention is to provide a sensor attachment tool and a fluid pressure cylinder, which are capable of suppressing outward protrusion.

One aspect of the present invention is characterized by a sensor attachment tool configured to attach a position sensor to a fluid pressure cylinder including a cylinder tube, and a cylinder cover configured to cover at least one of one end or another end of the cylinder tube, the sensor attachment tool comprising a holder configured to retain the position sensor in a rail structure extending in an axial direction of the cylinder tube, and an arm portion extending from one end part of the holder, wherein the arm portion is fixed to the cylinder cover by being screw-fastened thereto.

Another aspect of the present invention is characterized by a fluid pressure cylinder, comprising a cylinder tube, a cylinder cover configured to cover at least one of one end or another end of the cylinder tube, and a sensor attachment tool mounted on an outer circumferential part of the cylinder tube, wherein the sensor attachment tool comprises a holder configured to retain a position sensor in a rail structure extending in an axial direction of the cylinder tube, and an arm portion extending from one end part of the holder, and wherein the arm portion is fixed to the cylinder cover by being screw-fastened thereto.

According to the sensor attachment tool and the fluid pressure cylinder having the above-described aspects, since there is no need to provide a band tightening mechanism on an outer circumferential side of the holder, outward protrusion can be suppressed.

BRIEF DESCRIPTION OF DRAWINGS

FIG. 7 is an exploded perspective view of a sensor attachment tool and a fluid pressure cylinder according to a third embodiment of the present invention;

DESCRIPTION OF THE INVENTION

Figure 1:
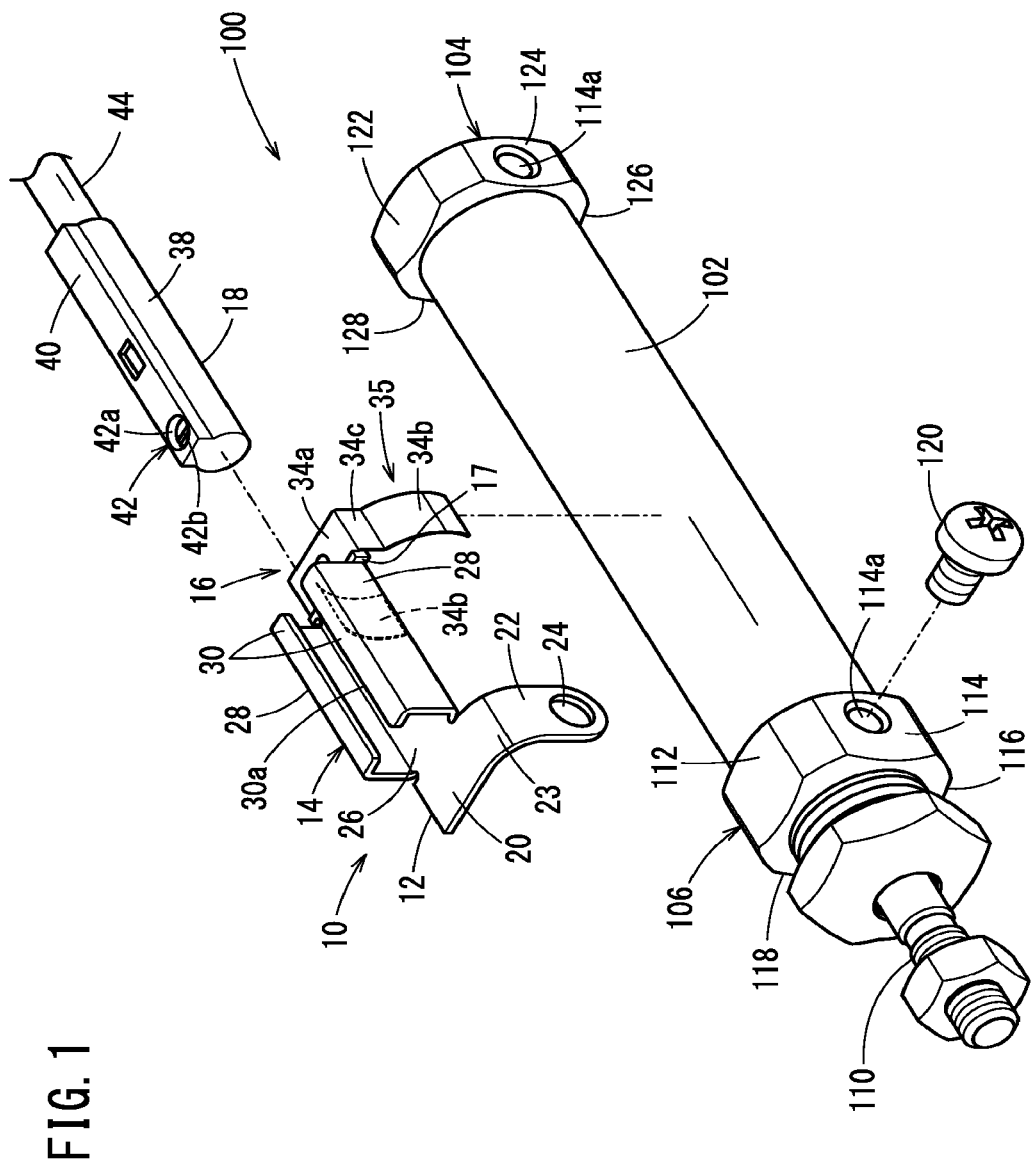
FIG. 1 is an exploded perspective view of a sensor attachment tool and a fluid pressure cylinder according to a first embodiment of the present invention.

Hereinafter, preferred embodiments of the present invention will be presented and described in detail below with reference to the accompanying drawings.

First Embodiment

A fluid pressure cylinder 100 according to the present embodiment is equipped with a cylinder tube 102, cylinder covers disposed at both ends of the cylinder tube 102, a sensor attachment tool 10 mounted on an outer circumferential part of the cylinder tube 102, and a position sensor 18. In the present embodiment, the cylinder covers are a head cover 104 and a rod cover 106.

The cylinder tube 102 of the fluid pressure cylinder 100 is made of a non-magnetic material and formed in a cylindrical shape, and a non-illustrated piston that slides in an axial direction is provided inside the cylinder tube 102. The piston partitions a space inside the cylinder tube 102 into a space on the side of the head cover 104, and a space on the side of the rod cover 106, and is operated based on a pressure difference between the two spaces. A magnet is provided on an outer circumferential part of the piston, and a position of the piston can be detected by a magnetic field of the magnet.

The head cover 104 covers one end of the cylinder tube 102. The head cover 104 has four flat surfaces 122, 124, 126, and 128 in the circumferential direction, is formed in a substantially square-like shape when viewed from one end side in the axial direction, and corner portions thereof are chamfered in an arcuate shape. In the flat surface 126 of the head cover 104, a non-illustrated port is formed which communicates with the interior part of the cylinder tube 102, and through which air is supplied and discharged. Screw holes 114a for screw-fastening the sensor attachment tool 10 are formed respectively on the flat surface 124 and the flat surface 128 of the head cover 104. The head cover 104 is joined to the cylinder tube 102 by crimping or screwing.

The rod cover 106 is joined to another end of the cylinder tube 102. The rod cover 106 has four flat surfaces 112, 114, 116, and 118 in the circumferential direction, is formed in a substantially square-like shape when viewed from another end side in the axial direction, and corner portions thereof are chamfered in an arcuate shape. In the flat surface 116 of the rod cover 106, a non-illustrated port is formed which communicates with the interior part of the cylinder tube 102, and through which air is supplied and discharged. Further, the screw holes 114a for screw-fastening the sensor attachment tool 10 are formed respectively on the flat surface 114 and the flat surface 118 of the rod cover 106. A fixing screw 120 is screwed into each of the screw holes 114a.

A piston rod 110 penetrates in the axial direction through a central portion of the rod cover 106. The piston rod 110 is joined to the piston inside the cylinder tube 102, and moves in the axial direction.

The sensor attachment tool 10 serves as a member for attaching the position sensor 18 to a predetermined position on the outer circumference of the cylinder tube 102, and is mounted by being screw-fastened to the head cover 104 or the rod cover 106 at one location. The sensor attachment tool 10 is equipped with an arm portion 12, a holder 14, and a grasping member 16.

The arm portion 12 is a member that is formed by bending a plate-shaped material into an L-shape, and includes a base portion 20 and an extended portion 22 that are brought into contact with the flat surfaces on the outer circumference of the head cover 104 or the rod cover 106 (cylinder cover). The base portion 20 is formed to extend from one end part of the holder 14 in the direction in which the holder 14 extends. A bent portion 23 extends from the side part of the base portion 20, and the extended portion 22 is formed to extend from a distal end of the bent portion 23 in a direction perpendicular to the base portion 20, and more specifically, in the circumferential direction of the cylinder cover. The extended portion 22 is formed only on one side of the base portion 20.

The bent portion 23 is formed in an arcuate shape, the curvature of which is equivalent to the curvature of the chamfered portion of the head cover 104 or the rod cover 106. The base portion 20 and the extended portion 22 are simultaneously placed in surface contact with two flat surfaces of the head cover 104 or the rod cover 106, and position the holder 14 in the circumferential direction. A hole 24 for screw-fastening the arm portion 12 is formed in a central part of the extended portion 22.

Figure 2A:
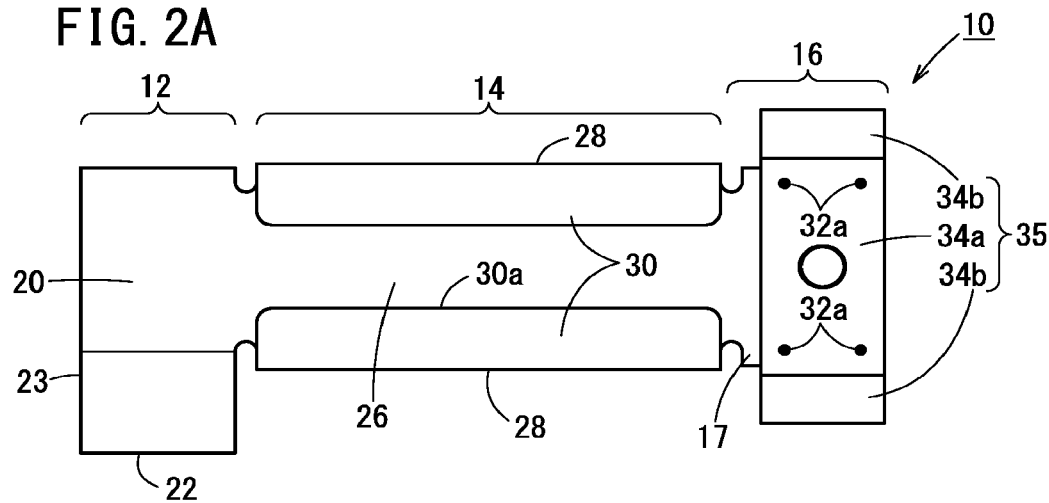
FIG. 2A is a plan view of the sensor attachment tool shown in FIG. 1.

As shown in FIG. 2A, the holder 14 includes a bottom portion 26, a pair of side walls 28 extending from both side parts of the bottom portion 26, and engaging portions 30 each of which is bent from an upper end part of each of the side walls 28 toward the opposing side wall 28. As shown in FIG. 1, the bottom portion 26, the side walls 28, and the engaging portions 30 are formed by bending a plate body that is formed with the arm portion 12.

The bottom portion 26 is integrally connected to the base portion 20 and extends in the axial direction, and is formed in the same plane as the base portion 20. The side walls 28 are formed perpendicularly to the bottom portion 26, and are bent in a direction opposite to that of the extended portion 22. The side walls 28 are provided as a pair on both side parts of the bottom portion 26. Each of the engaging portions 30 is bent and extends from the upper end part of each of the side walls 28 toward the opposing side wall 28.

As shown in FIG. 2A, one of the engaging portions 30 and the other of the engaging portions 30 are separated from each other by a slit-shaped gap 30a through which a protruding part 40 of the position sensor 18, to be described later, is inserted. The bottom portion 26, the pair of side walls 28, and the engaging portions 30 form a rail structure in which the position sensor 18 is retained so as to be capable of sliding in the axial direction.

Figure 2B:
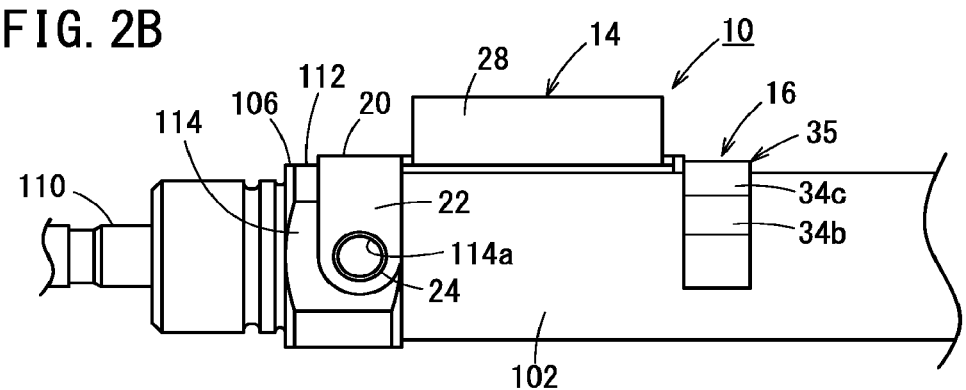
FIG. 2B is an enlarged side view showing the fluid pressure cylinder of FIG. 1 in a vicinity of the sensor attachment tool.
Figure 2C:
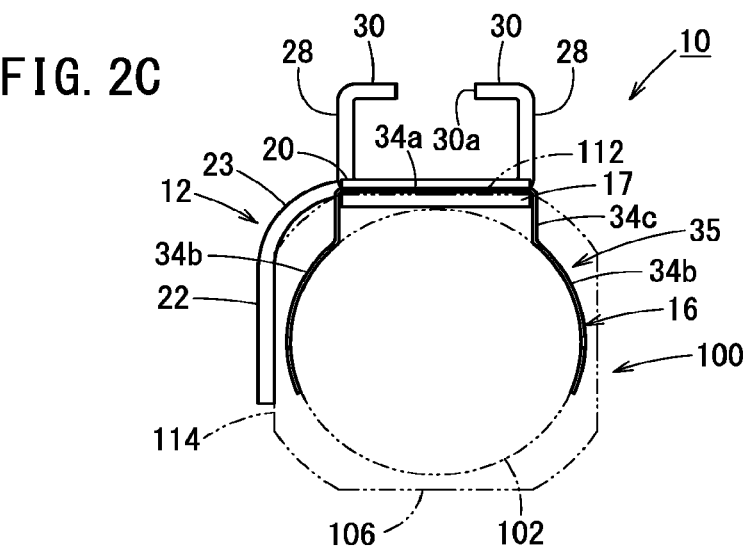
FIG. 2C is a schematic view showing a contact portion between the fluid pressure cylinder and an arm portion and a clip of the sensor attachment tool of FIG. 1.

As shown in FIG. 1, the grasping member 16 is equipped with a supporting portion 17 that extends in a longitudinal direction of the holder 14 from the other end part of the holder 14, and a clip 35 that is joined to the supporting portion 17. The supporting portion 17 is a plate-shaped member extending integrally from the bottom portion 26 of the holder 14. The clip 35 is constituted, for example, by a spring member made up from a thin metal plate. As shown in FIG. 2C, the clip 35 is equipped with a joint portion 34a joined to an upper surface of the supporting portion 17, and a pair of leaf spring portions 34b formed in an arcuate shape having a radius of curvature smaller than that of the cylinder tube 102. As shown in FIG. 2A, the joint portion 34a is joined to the upper surface of the supporting portion 17 at a plurality of welded portions 32a.

From both side parts of the joint portion 34a, a pair of connecting portions 34c are bent and extend from the joint portion 34a, and the leaf spring portions 34b are integrally connected via the connecting portions 34c on both side parts of the joint portion 34a. The pair of leaf spring portions 34b are curved in an arcuate shape along the outer circumference of the cylinder tube 102 and have distal end side portions, the distance between which is narrowed in the widthwise direction, and thus are configured such that, when mounted on the cylinder tube 102, the pair of leaf spring portions 34b can be fitted onto the cylinder tube 102.

As shown in FIG. 1, as the position sensor 18, a general-purpose product that is generally sold and distributed as a cylinder sensor can be used. The position sensor 18 includes a columnar rod-shaped portion 38 in order to enable the attachment position thereof to be adjusted in the longitudinal direction of the holder 14. The rod-shaped portion 38 has an internally installed sensor element that serves to detect magnetism. Further, the protruding part 40 is formed on the rod-shaped portion 38 in a projecting manner along the longitudinal direction of the rod-shaped portion 38.

The rod-shaped portion 38 is formed with a diameter that enables the rod-shaped portion 38 to be inserted into the interior of the rail structure constituted by the side walls 28 and the engaging portions 30. The protruding part 40 is formed with a width that is slightly narrower than the slit-shaped gap 30a, and is mounted in the holder 14 in a state of projecting out from the slit-shaped gap 30a. The position sensor 18 includes a fixing member 42 in order to fix the position sensor 18 to the holder 14.

The fixing member 42 includes a screw hole 42a that penetrates from the protruding part 40 to the rod-shaped portion 38, and a screw 42b that is screwed into the screw hole 42a. The fixing member 42 acts in a manner so that a distal end part of the screw 42b projects out from the screw hole 42a so as to press the rod-shaped portion 38 against the engaging portions 30, thereby fixing the position sensor 18 in the holder 14. A wire 44 through which signals are transmitted from the sensor element extends from one end of the rod-shaped portion 38 in the longitudinal direction.

The sensor attachment tool 10 and the fluid pressure cylinder 100 according to the present embodiment are configured in the manner described above, and the operations thereof will be described hereinafter.

The operation of mounting the sensor attachment tool 10 is performed, initially, by bringing the arm portion 12 into contact with the head cover 104 or the rod cover 106, and bringing the grasping member 16 into contact with the cylinder tube 102. In the case that the sensor attachment tool 10 is mounted on the side of the rod cover 106, as shown in FIG. 2B, the base portion 20 of the arm portion 12 is placed in surface contact with the flat surface 112 of the rod cover 106, and the extended portion 22 of the arm portion 12 is placed in surface contact with the flat surface 114 of the rod cover 106. Consequently, rotation of the sensor attachment tool 10 can be prevented, and the sensor attachment tool 10 is positioned in the circumferential direction.

Further, as shown in FIG. 2C, the grasping member 16 pushes the distal ends of the leaf spring portions 34b of the clip 35 onto the cylinder tube 102 in a manner so as to expand the distal ends, thereby causing the clip 35 to be fitted onto the cylinder tube 102. The clip 35 grips the cylinder tube 102 by the elastic restorative force of the leaf spring portions 34b. Consequently, after the clip 35 has been fitted thereon, the sensor attachment tool 10 does not fall off from the cylinder tube 102 even if one's hand is released from the sensor attachment tool 10, and the sensor attachment tool 10 is maintained in a state of being positioned in the circumferential direction.

Figure 3A:
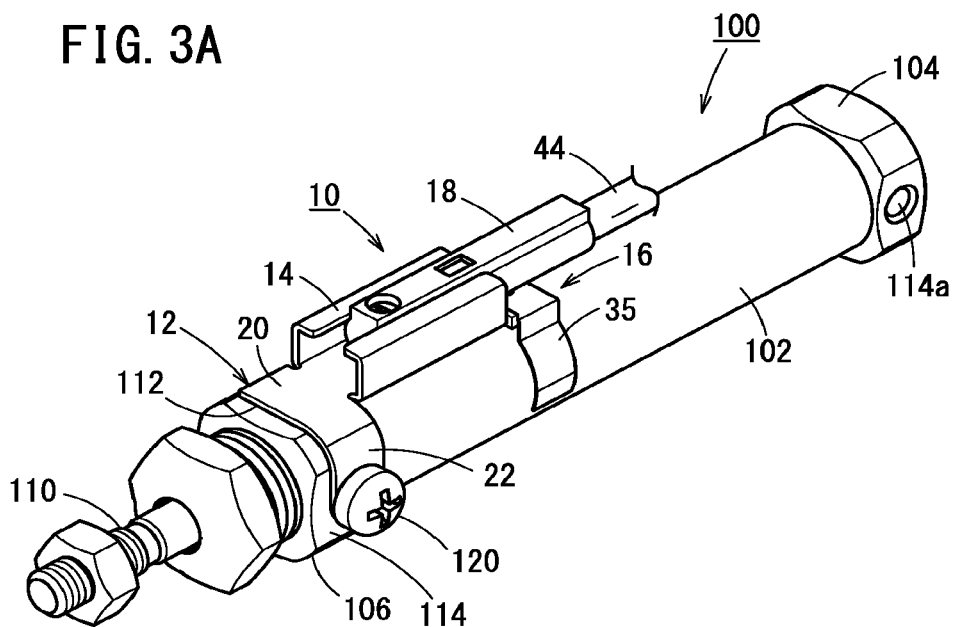
FIG. 3A is a perspective view showing a state in which a position sensor is mounted on a side of a rod cover using the sensor attachment tool of FIG. 1.

Thereafter, as shown in FIG. 3A, the fixing screw 120 is tightened in the screw hole 114a through the hole 24 of the extended portion 22 of the arm portion 12, whereupon the operation of mounting the sensor attachment tool 10 is brought to an end. The sensor attachment tool 10 is positioned in the circumferential direction by the arm portion 12, and the clip 35 is fitted onto the cylinder tube 102. Therefore, when the fixing screw 120 is tightened, the operation of mounting can be easily performed, simply by lightly pressing the sensor attachment tool 10 to a degree that closes the hole 24.

Figure 3B:
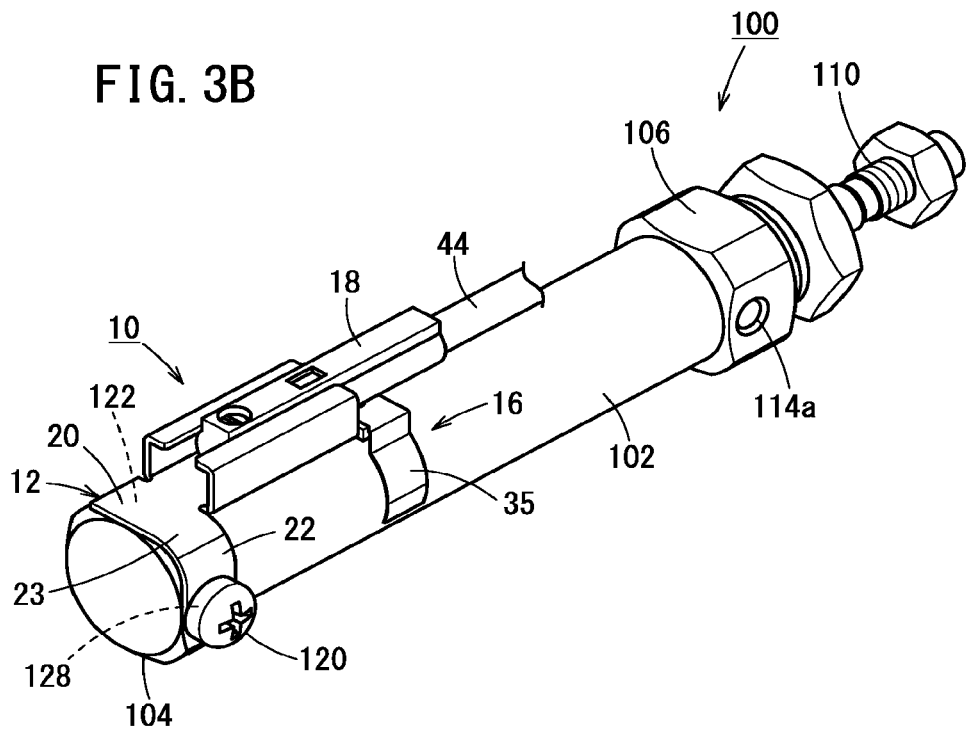
FIG. 3B is a perspective view showing a state in which the position sensor is mounted on a side of a head cover using the sensor attachment tool of FIG. 1.

Further, as shown in FIG. 3B, in the case that the sensor attachment tool 10 is mounted on the side of the head cover 104, the arm portion 12 is placed in surface contact with the flat surface of the head cover 104. In this case, the base portion 20 of the arm portion 12 is placed in contact with the flat surface 122 of the head cover 104, and the extended portion 22 of the arm portion 12 is placed in contact with the flat surface 128 of the head cover 104. Then, the clip 35 of the grasping member 16 is fitted onto the cylinder tube 102. Thereafter, the sensor attachment tool 10 can be mounted on the side of the head cover 104 by tightening the fixing screw 120 in the screw hole 114a provided in the flat surface 128 of the head cover 104 through the hole 24 of the extended portion 22.

The sensor attachment tool 10 and the fluid pressure cylinder 100 according to the present embodiment realize the following advantageous effects.

The present embodiment relates to the sensor attachment tool 10 for attaching the position sensor 18 to the fluid pressure cylinder 100 having the cylinder tube 102, and the cylinder covers that cover the one end and the other end of the cylinder tube 102. The sensor attachment tool 10 is equipped with the holder 14 that retains the position sensor 18 in the rail structure extending in the axial direction of the cylinder tube 102, and the arm portion 12 extending from the one end part of the holder 14, wherein the arm portion 12 is fixed to the cylinder cover by being screw-fastened thereto.

Due to the above-described configuration, the arm portion 12 can be directly fixed to the head cover 104 or the rod cover 106 by screwing. Thus, there is no need to provide a band and a band tightening member on an outer side of the holder 14 of the sensor attachment tool 10. Therefore, outward protrusion of the sensor attachment tool 10 can be suppressed.

In the above-described sensor attachment tool 10, the arm portion 12 may be configured to be fixed to the cylinder cover at a position shifted from the holder 14 in the circumferential direction. In accordance with this feature, it is possible to prevent interference between the fixing screw 120 that is used for fixing, and the position sensor 18 that is mounted in the holder 14, and the position sensor 18 can be easily mounted in the holder 14.

Incidentally, a case may occur in which the magnet provided on the piston of the fluid pressure cylinder 100 is disposed within a limited location in the circumferential direction. In this case, when a conventional sensor attachment tool is attached to the cylinder tube 102, an operation of fixing the sensor attachment tool while maintaining the position thereof in the circumferential direction has been required, and proficiency in performing the operation of mounting the sensor attachment tool has been necessary.

In contrast thereto, with the above-described sensor attachment tool 10, a configuration is provided in which the cylinder covers include the plurality of flat surfaces 112 and 122 in the circumferential direction, and the arm portion 12 contacts the flat surfaces 112 and 122 to thereby position the holder 14 in the circumferential direction. Consequently, the user is capable of mounting the sensor attachment tool 10 on the fluid pressure cylinder 100 without requiring any specialized proficiency.

In the above-described sensor attachment tool 10, a configuration may be provided in which the arm portion 12 includes the base portion 20 that extends in the direction in which the holder 14 extends, and the extended portion 22 that is bent and extended from the base portion 20 in the circumferential direction of the cylinder cover, and the extended portion 22 is fixed to the cylinder cover. In accordance with these features, positioning of the holder 14 in the circumferential direction is facilitated, and the fixing screw 120 can be screwed at a position not interfering with the holder 14.

The extended portion 22 of the above-described sensor attachment tool 10 may be extended only on one side in the circumferential direction of the holder 14. In accordance with this feature, the structure can be simplified.

In the above-described sensor attachment tool 10, the clip 35 that is fitted onto the cylinder tube 102 may be provided on the other end part of the holder 14. In accordance with this feature, the holder 14 can be aligned in parallel with the axial direction of the cylinder tube 102. Further, after the clip 35 has been fitted, falling off of the sensor attachment tool 10 can be prevented, and the operation of mounting the sensor attachment tool 10 is facilitated.

The fluid pressure cylinder 100 according to the present embodiment is equipped with the above-described sensor attachment tool 10. In accordance with such a fluid pressure cylinder 100, since outward protrusion is suppressed, the fluid pressure cylinder 100 can be used in a narrow space. Further, in the above-described fluid pressure cylinder 100, the position sensor 18 may further be mounted in the sensor attachment tool 10.

Second Embodiment

Figure 4:
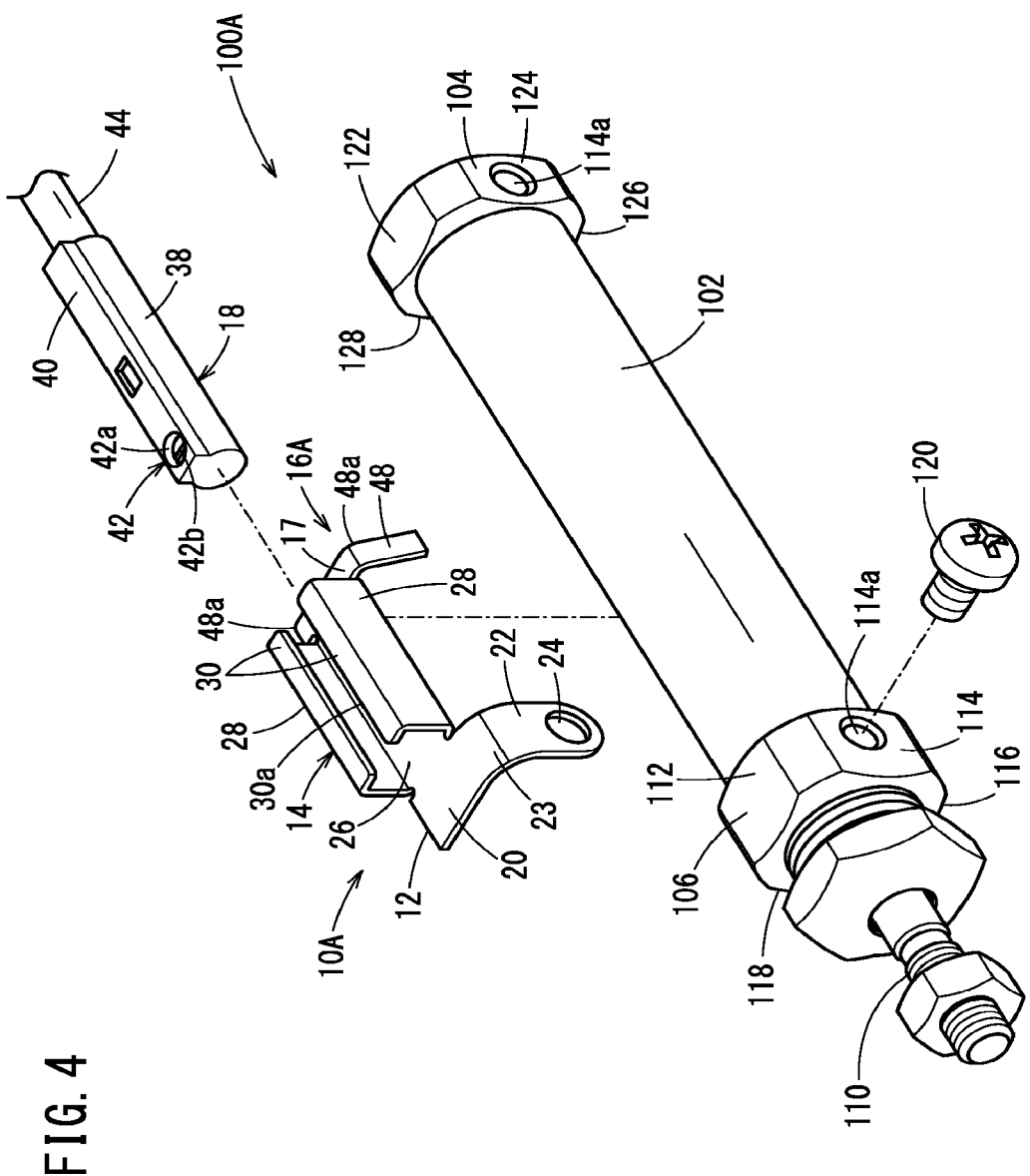
FIG. 4 is an exploded perspective view of a sensor attachment tool and a fluid pressure cylinder according to a second embodiment of the present invention.

As shown in FIG. 4, a sensor attachment tool 10A and a fluid pressure cylinder 100A according to the present embodiment differ from the sensor attachment tool 10 and the fluid pressure cylinder 100 shown in FIG. 1 in terms of the structure of a grasping member 16A. Moreover, in the sensor attachment tool 10A and the fluid pressure cylinder 100A, the same constituent elements as those of the sensor attachment tool 10 and the fluid pressure cylinder 100 of FIG. 1 are designated by the same reference numerals, and detailed description thereof is omitted.

Figure 5A:
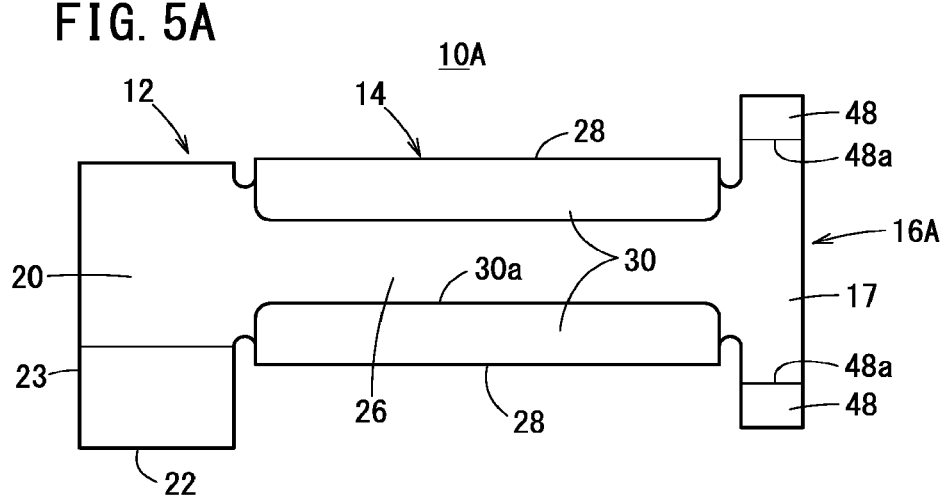
FIG. 5A is a plan view of the sensor attachment tool shown in FIG. 4.
Figure 5B:
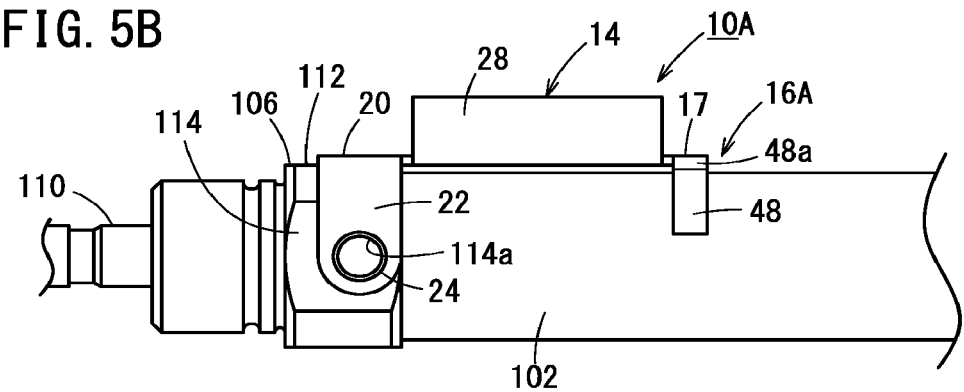
FIG. 5B is an enlarged side view showing the fluid pressure cylinder of FIG. 4 in a vicinity of the sensor attachment tool.
Figure 5C:
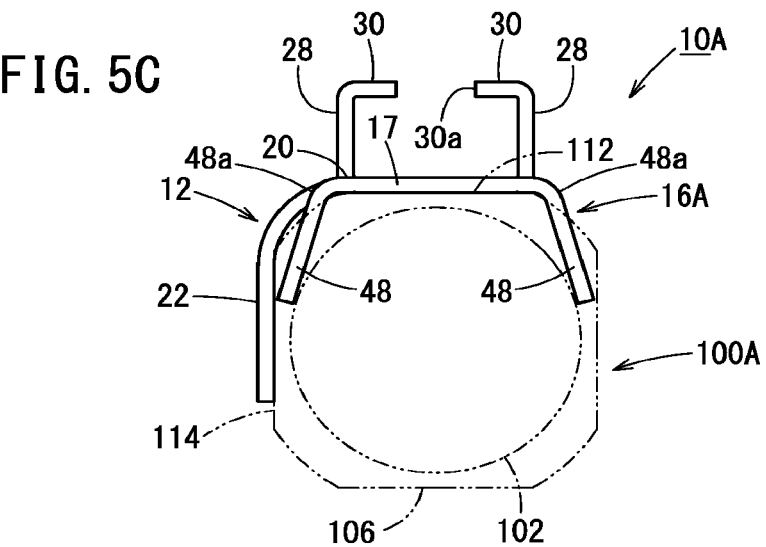
FIG. 5C is a schematic view showing a contact portion between the fluid pressure cylinder and an arm portion and a support portion of the sensor attachment tool of FIG. 4.

As shown in FIG. 4, in the sensor attachment tool 10A, the grasping member 16A includes support portions 48 that are inclined and extend toward the cylinder tube 102. As shown in FIG. 5A, the support portions 48 are band-shaped members extending in an elongate manner in the lateral direction of the holder 14, and are provided in a pair on both side parts of the supporting portion 17 of the grasping member 16A. As shown in FIGS. 5B and 5C, the pair of support portions 48 are inclined at an angle to allow the support portions 48 to contact two locations on the outer circumference of the cylinder tube 102. The support portions 48 are integrally formed with the supporting portion 17, and are formed by being bent at bent portions 48a from the supporting portion 17 at a predetermined angle.

The sensor attachment tool 10A and the fluid pressure cylinder 100A according to the present embodiment are configured in the manner described above, and the operations thereof will be described hereinafter.

Figure 6A:
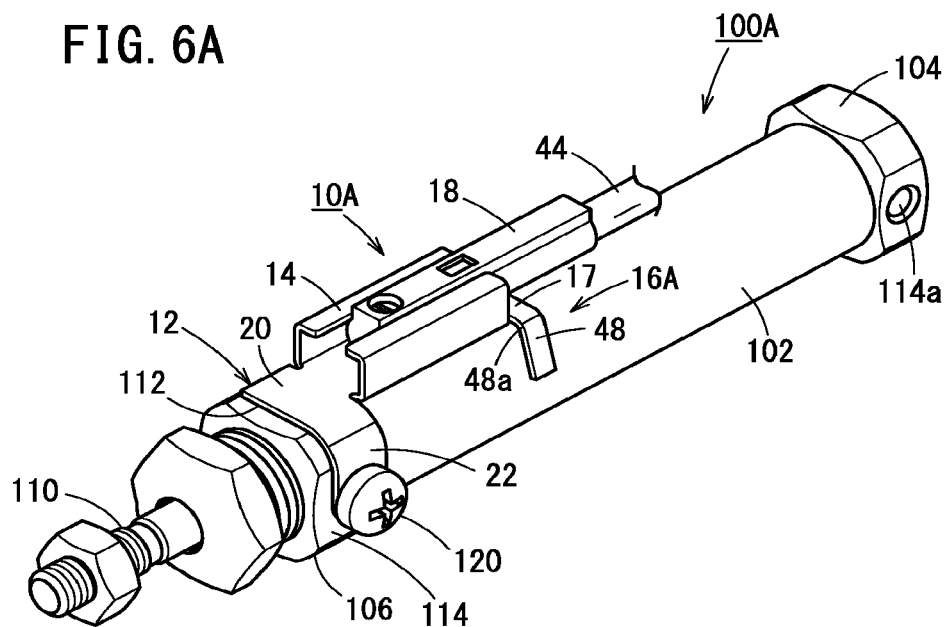
FIG. 6A is a perspective view showing a state in which a position sensor is mounted on a side of a rod cover using the sensor attachment tool of FIG. 4.

As shown in FIG. 6A, the operation of mounting the sensor attachment tool 10A is performed by bringing the arm portion 12 into contact with the rod cover 106, and bringing the grasping member 16A into contact with the cylinder tube 102. The base portion 20 and the extended portion 22 of the arm portion 12 are placed in contact respectively with the flat surface 112 and the flat surface 114 of the rod cover 106, whereby the holder 14 is positioned in the circumferential direction. Then, as shown in FIG. 5C, the support portions 48 of the grasping member 16A are placed in contact with the two locations on the outer circumferential part of the cylinder tube 102, whereby the other end part of the holder 14 is positioned.

Figure 6B:
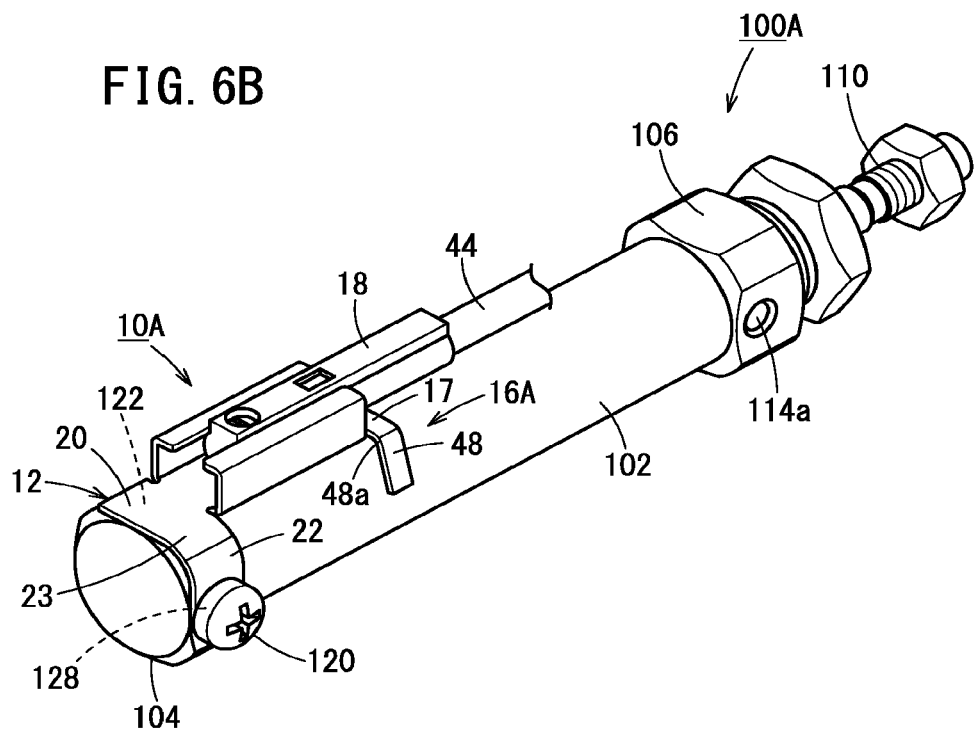
FIG. 6B is a perspective view showing a state in which the position sensor is mounted on a side of a head cover using the sensor attachment tool of FIG. 4.

Thereafter, as shown in FIG. 6A, the fixing screw 120 is tightened in the screw hole 114a through the hole 24 of the extended portion 22 of the arm portion 12, whereupon the operation of mounting the sensor attachment tool 10A is brought to an end. Moreover, in the case that the sensor attachment tool 10A is attached to the head cover 104, as shown in FIG. 6B, the arm portion 12 may be placed in contact with the flat surface of the head cover 104 and screw-fastened thereto.

The sensor attachment tool 10A and the fluid pressure cylinder 100A according to the present embodiment realize the following advantageous effects.

The sensor attachment tool 10A according to the present embodiment includes the support portions 48 which are provided on the other end part of the holder 14, and which contact at least two locations on the outer circumference of the cylinder tube 102. In accordance with such a configuration, the holder 14 can be aligned in parallel with the axial direction of the cylinder tube 102, and the operation of mounting the sensor attachment tool 10A can be facilitated. Further, the sensor attachment tool 10A of the present embodiment is superior in terms of productivity, because there is no need for another member such as a spring member or the like to be welded thereto, and the sensor attachment tool 10A can be formed merely by bending an integrally formed plate-like member.

Third Embodiment

Figure 8A:
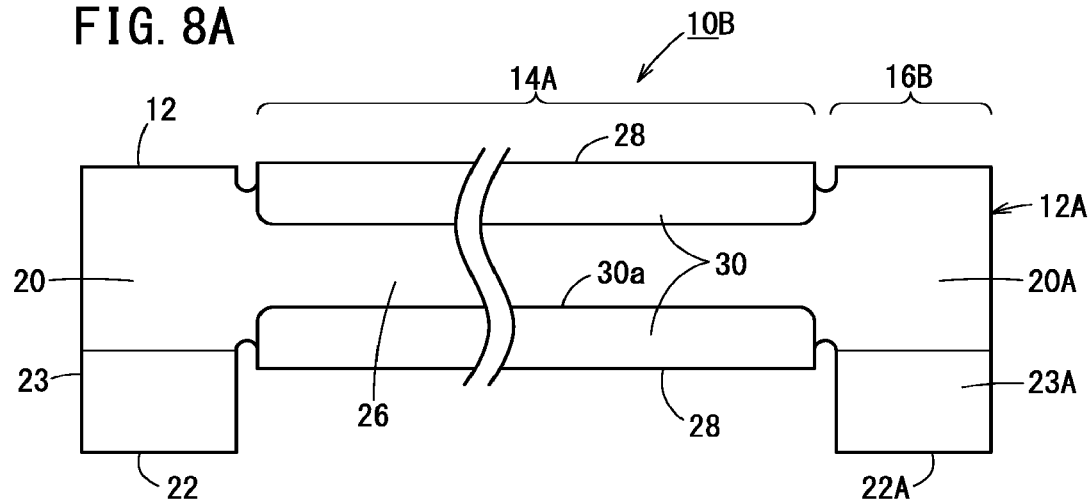
FIG. 8A is a plan view of the sensor attachment tool shown in FIG. 7.

As shown in FIG. 7, a sensor attachment tool 10B and a fluid pressure cylinder 100B according to the present embodiment include an elongate holder 14A formed to have the same length as that of the cylinder tube 102. As shown in FIG. 8A, an arm portion 12 is provided at one end part of the holder 14A, and a second arm portion 12A that serves as a grasping member 16B is provided at another end part of the holder 14A. The configuration of the arm portion 12 is the same as that of the arm portion 12 of the sensor attachment tool 10 of FIG. 1. Further, the holder 14A is the same as the holder 14 of the sensor attachment tool 10 of FIG. 1, except that the holder 14A is elongated.

Figure 8B:
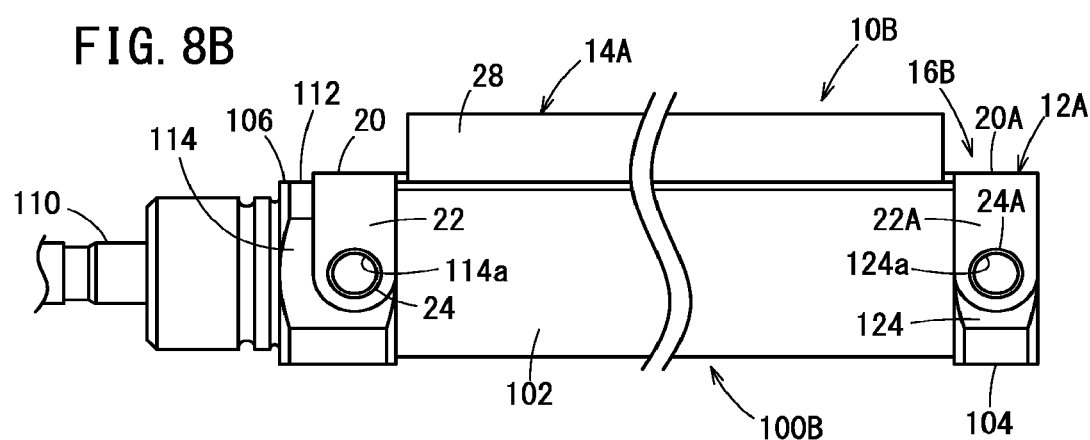
FIG. 8B is an enlarged side view showing the fluid pressure cylinder of FIG. 7 in a vicinity of the sensor attachment tool.
Figure 8C:
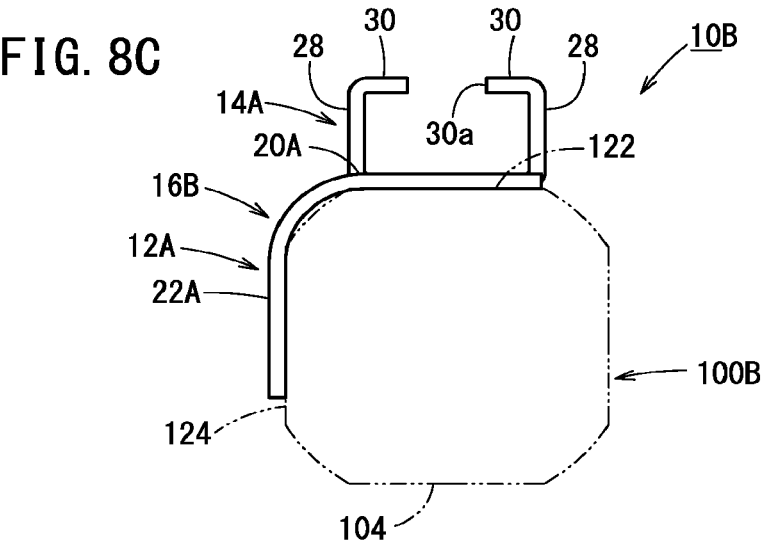
FIG. 8C is a schematic view showing a contact portion between a cylinder cover and an arm portion of the sensor attachment tool of FIG. 7.

The second arm portion 12A includes a base portion 20A extending from a bottom portion 26 of the holder 14A to another end side in the longitudinal direction, and an extended portion 22A extended from the base portion 20A via a bent portion 23A. As shown in FIG. 8C, the extended portion 22A is extended in a direction substantially perpendicular to the base portion 20A. As shown in FIG. 8B, a hole 24A for screw-fastening is formed in a central part of the extended portion 22A.

Figure 9:
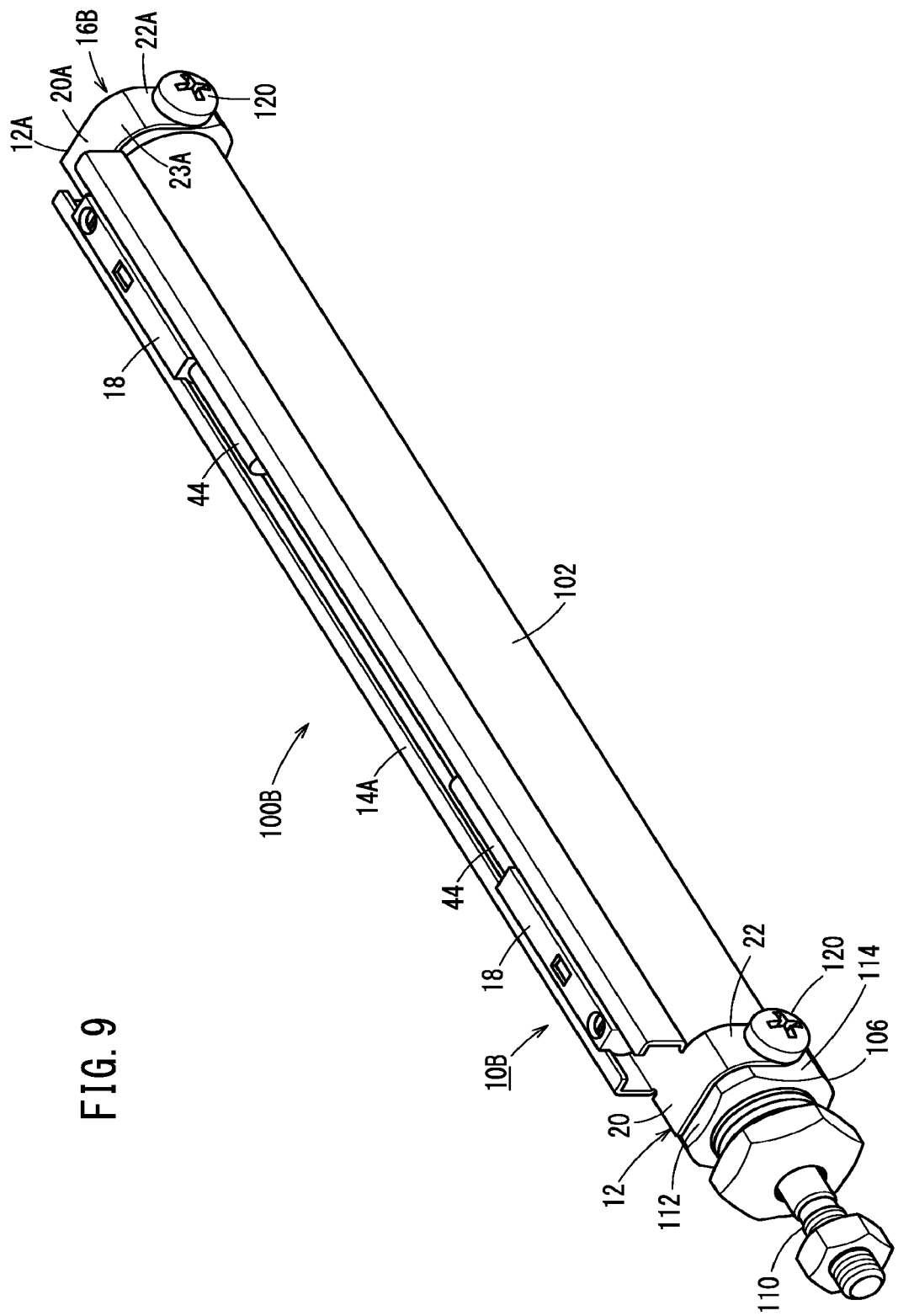
FIG. 9 is a perspective view showing an example in which two position sensors are mounted on the fluid pressure cylinder using the sensor attachment tool of FIG. 7.

As shown in FIG. 9, in the sensor attachment tool 10B, the arm portion 12 contacts one of the cylinder covers (the rod cover 106 in the illustrated example), and the second arm portion 12A contacts another one of the cylinder covers (the head cover 104 in the illustrated example). The arm portion 12 and the second arm portion 12A are fixed by fixing screws 120 at one location each. In order to facilitate the fixing operation, the arm portion 12 and the second arm portion 12A are preferably formed on the same side part of the holder 14A.

The sensor attachment tool 10B and the fluid pressure cylinder 100B according to the present embodiment realize the following advantageous effects.

The sensor attachment tool 10B of the present embodiment includes the holder 14A having a length equivalent to the length of the cylinder tube 102. The second arm portion 12A, which is screw-fastened to the head cover 104 of the cylinder tube 102, is provided at the other end part of the holder 14A.

According to the above-described configuration, since the holder 14A is formed with the same length as that of the cylinder tube 102, the position sensor 18 can be attached to an arbitrary position on the cylinder tube 102. Further, since the one end and the other end of the holder 14A are securely fixed by the arm portion 12 and the second arm portion 12A by screw-fastening, the holder 14A can be securely fixed to the elongate cylinder tube 102 without rattling.

In the above-described sensor attachment tool 10B, a configuration may be provided in which the arm portion 12 at the one end part of the holder 14A, and the second arm portion 12A at the other end part of the holder 14A are screwed-fastened to the cylinder cover on the same side. In accordance with this feature, since the sensor attachment tool 10B can be attached by a screw-fastening operation from one side, mounting of the sensor attachment tool 10B can be easily performed even in the case that the direction of access is limited.

Although descriptions of preferred embodiments of the present invention have been presented above, it should be understood that the present invention is not limited to the above-described embodiments, but various changes and modifications may be made thereto within a range that does not deviate from the essence and gist of the present invention.

The invention claimed is:

1. A sensor attachment tool configured to attach a position sensor to a fluid pressure cylinder including a cylinder tube, and a first cylinder cover configured to cover a first end part of the cylinder tube and a second cylinder cover configured to cover a second end part of the cylinder tube, the sensor attachment tool comprising:
   a holder configured to retain the position sensor in a rail structure extending in an axial direction of the cylinder tube; and
   a first arm portion extending from a first end part of the holder in the axial direction,
   wherein the holder comprises a plate-shaped bottom portion and a pair of side walls extending from both sides of the bottom portion,
   the first arm portion is connected to the bottom portion at the first end part of the holder, the first arm portion comprising a first base portion formed in a same plane as the bottom portion and a first extended portion formed by a plate extending from the first base portion in a circumferential direction, and
   the first extended portion is fixed to the first cylinder cover by being screw-fastened thereto.

2. The sensor attachment tool according to claim 1, wherein the first extended portion extends to a position shifted from the holder in the circumferential direction and fixed to the first cylinder cover at said position.

3. The sensor attachment tool according to claim 1, wherein the first cylinder cover includes flat surfaces in the circumferential direction, and at least the first base portion of the first arm portion contacts the flat surfaces to thereby position the holder in the circumferential direction.

4. The sensor attachment tool according to claim 1, wherein the first extended portion is extended only on one side of the first base portion.

5. The sensor attachment tool according to claim 1, further comprising a clip provided on a second end part of the holder in the axial direction and configured to be fitted onto the cylinder tube.

6. The sensor attachment tool according to claim 1, further comprising support portions provided on a second end part of the holder in the axial direction and configured to contact at least two locations on an outer circumference of the cylinder tube.

7. The sensor attachment tool according to claim 1, wherein the holder is formed with a length equivalent to a length of the cylinder tube, the sensor attachment tool further comprising a second arm portion extending from a second end part of the holder in the axial direction, and
   the second arm portion is connected to the bottom portion at the second end part of the holder, the second arm portion comprising a second base portion formed in a same plane as the bottom portion and a second extended portion formed by a plate extending from the second base portion in the circumferential direction, and the second arm portion is configured to be screw-fastened to the second cylinder cover.

8. The sensor attachment tool according to claim 7, wherein the first extended portion at the first end part of the holder, and the second extended portion at the second end part of the holder are extended on a same side in the circumferential direction.

9. A fluid pressure cylinder, comprising:
   a cylinder tube;
   a first cylinder cover configured to cover a first end of the cylinder tube;
   a second cylinder cover configured to cover a second end of the cylinder tube; and
   a sensor attachment tool mounted on an outer circumferential part of the cylinder tube,
   wherein the sensor attachment tool comprises:
   a holder configured to retain a position sensor in a rail structure extending in an axial direction of the cylinder tube; and
   a first arm portion extending from a first end part of the holder in the axial direction, and
   wherein the holder comprises a plate-shaped bottom portion and a pair of side walls extending from both sides of the bottom portion,
   the first arm portion is connected to the bottom portion at the first end part of the holder, the first arm portion comprising a first base portion formed in a same plane as the bottom portion and a first extended portion formed by a plate extending from the first base portion in a circumferential direction, and
   the first extended portion is fixed to the first cylinder cover or the second cylinder cover by being screw-fastened thereto.

10. The fluid pressure cylinder according to claim 9, further comprising the position sensor retained in the sensor attachment tool.

\* \* \* \* \*